United States Patent
Terenzio et al.

(10) Patent No.: US 12,529,738 B2
(45) Date of Patent: Jan. 20, 2026

(54) PATIENT-COMPLIANT MRI COIL EMPLOYING PATIENT ANATOMY FOR COIL LOCATION

(71) Applicant: Inkspace Imaging, Inc., Pleasanton, CA (US)

(72) Inventors: Dennis Martin Terenzio, Boise, ID (US); Tracy Allyn Wynn, Pleasanton, CA (US); Gillian Gentry Haemer, Pleasanton, CA (US); Pulkit Malik, Dublin, CA (US)

(73) Assignee: Inkspace Imaging, Inc., Pleasanton, CA (US)

(*) Notice: Subject to any disclaimer, the term of this patent is extended or adjusted under 35 U.S.C. 154(b) by 0 days.

(21) Appl. No.: 19/085,315

(22) Filed: Mar. 20, 2025

(65) Prior Publication Data

US 2025/0244421 A1    Jul. 31, 2025

Related U.S. Application Data

(63) Continuation of application No. PCT/US2024/048358, filed on Sep. 25, 2024.

(60) Provisional application No. 63/602,599, filed on Nov. 25, 2023.

(51) Int. Cl.
*G01R 33/34* (2006.01)
*A61B 5/00* (2006.01)
*A61B 5/055* (2006.01)

(52) U.S. Cl.
CPC ...... *G01R 33/34084* (2013.01); *A61B 5/0042* (2013.01); *A61B 5/055* (2013.01); *A61B 5/6803* (2013.01); *A61B 5/684* (2013.01)

(58) Field of Classification Search
CPC . G01R 33/34084; A61B 5/0042; A61B 5/055; A61B 5/6803; A61B 5/684
See application file for complete search history.

(56) References Cited

U.S. PATENT DOCUMENTS

| | | |
|---|---|---|
| 9,696,393 B2 | 7/2017 | Arias et al. |
| 9,880,238 B2 | 1/2018 | Arias et al. |
| 10,827,948 B1 | 11/2020 | Tramm et al. |
| 11,402,446 B2 | 8/2022 | Lustig et al. |

(Continued)

FOREIGN PATENT DOCUMENTS

| | | |
|---|---|---|
| AU | 2023221895 A1 | 10/2024 |
| CA | 3055214 A1 | 9/2018 |

(Continued)

OTHER PUBLICATIONS

"International Application Serial No. PCT/US2024/048358, International Search Report mailed Dec. 12, 2024", 5 pgs.

(Continued)

*Primary Examiner* — Christopher L Cook
(74) *Attorney, Agent, or Firm* — Schwegman Lundberg & Woessner, P.A.

(57) ABSTRACT

An MRI receive coil is provided comprising: a first side panel; a second side panel; a first plurality of receive antennas located at the first side panel; a first sound chamber for noise suppression or audio receive located at the first side panel; a second plurality of receive antennas located at the second side panel; a second sound chamber for noise suppression or audio receive can be located at the second side panel.

20 Claims, 13 Drawing Sheets

(56) References Cited

U.S. PATENT DOCUMENTS

| | | | |
|---|---|---|---|
| 11,500,048 B2 | 11/2022 | Corea et al. | |
| 12,183,990 B2 | 12/2024 | Corea et al. | |
| 2008/0007259 A1* | 1/2008 | Driemel | G01R 33/3415 |
| | | | 600/410 |
| 2009/0203990 A1 | 8/2009 | Noras | |
| 2013/0131498 A1 | 5/2013 | Taracila et al. | |
| 2013/0317346 A1 | 11/2013 | Alagappan et al. | |
| 2015/0141803 A1* | 5/2015 | Tramm | A61B 5/053 |
| | | | 600/415 |
| 2020/0146553 A1 | 5/2020 | Lustig et al. | |
| 2020/0256937 A1* | 8/2020 | Iwasawa | A61B 5/0042 |
| 2021/0121066 A1 | 4/2021 | Rheineck et al. | |
| 2021/0278489 A1* | 9/2021 | Iwasawa | G01R 33/34084 |
| 2022/0409085 A1 | 12/2022 | Rheineck et al. | |
| 2024/0016384 A1 | 1/2024 | Lustig et al. | |
| 2025/0093441 A1 | 3/2025 | Wynn et al. | |

FOREIGN PATENT DOCUMENTS

| | | | | |
|---|---|---|---|---|
| CA | 3127446 | A1 | 7/2020 | |
| CA | 3059734 | C | 6/2022 | |
| CN | 113766947 | A | 12/2021 | |
| CN | 119013576 | A | 11/2024 | |
| DE | 102021210587 | A1 | 3/2023 | |
| EP | 3914338 | B1 | 6/2024 | |
| EP | 4479761 | A1 | 12/2024 | |
| HK | 40065367 | A | 7/2022 | |
| HK | 40065370 | A | 7/2022 | |
| IN | 201917037961 | A | 12/2019 | |
| IN | 536544 | B | 5/2024 | |
| IN | 202417069822 | A | 1/2025 | |
| JP | H0422906 | * | 2/1992 | |
| JP | 7461362 | B2 | 3/2024 | |
| JP | 2024074826 | A | 5/2024 | |
| JP | 2025506689 | A | 3/2025 | |
| KR | 20190127803 | A | 11/2019 | |
| KR | 20210121097 | A | 10/2021 | |
| KR | 102378470 | B1 | 3/2022 | |
| KR | 20240161122 | A | 11/2024 | |
| WO | WO-2017130025 A1 | * | 8/2017 | A61B 5/055 |
| WO | WO-2018195403 A1 | | 10/2018 | |
| WO | WO-2018165596 A9 | | 12/2018 | |
| WO | WO-2020154414 A1 | | 7/2020 | |
| WO | WO-2023158637 A1 | | 8/2023 | |
| WO | WO-2025111058 A1 | | 5/2025 | |

OTHER PUBLICATIONS

"International Application Serial No. PCT/US2024/048358, Written Opinion mailed Dec. 12, 2024", 9 pgs.

\* cited by examiner

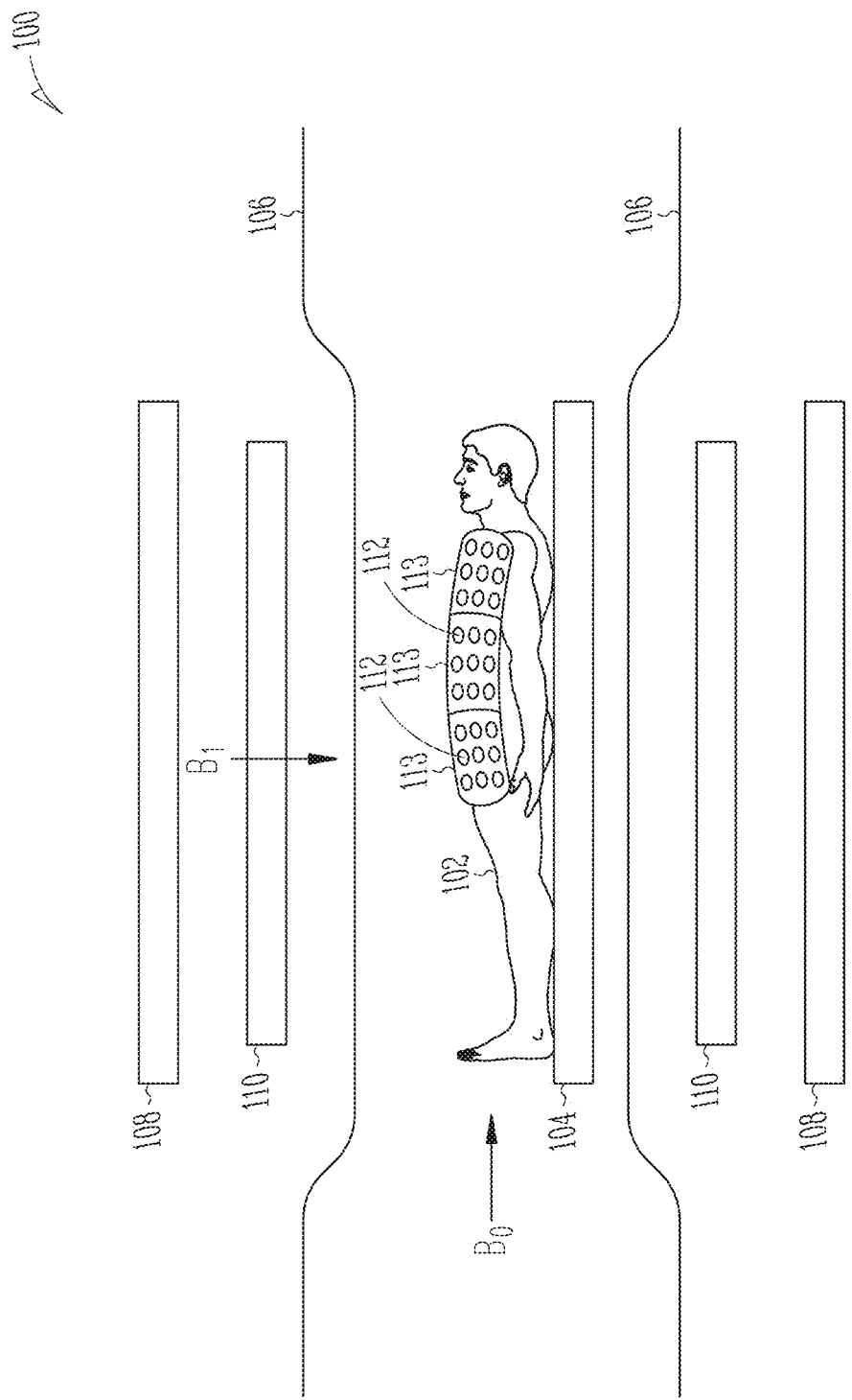

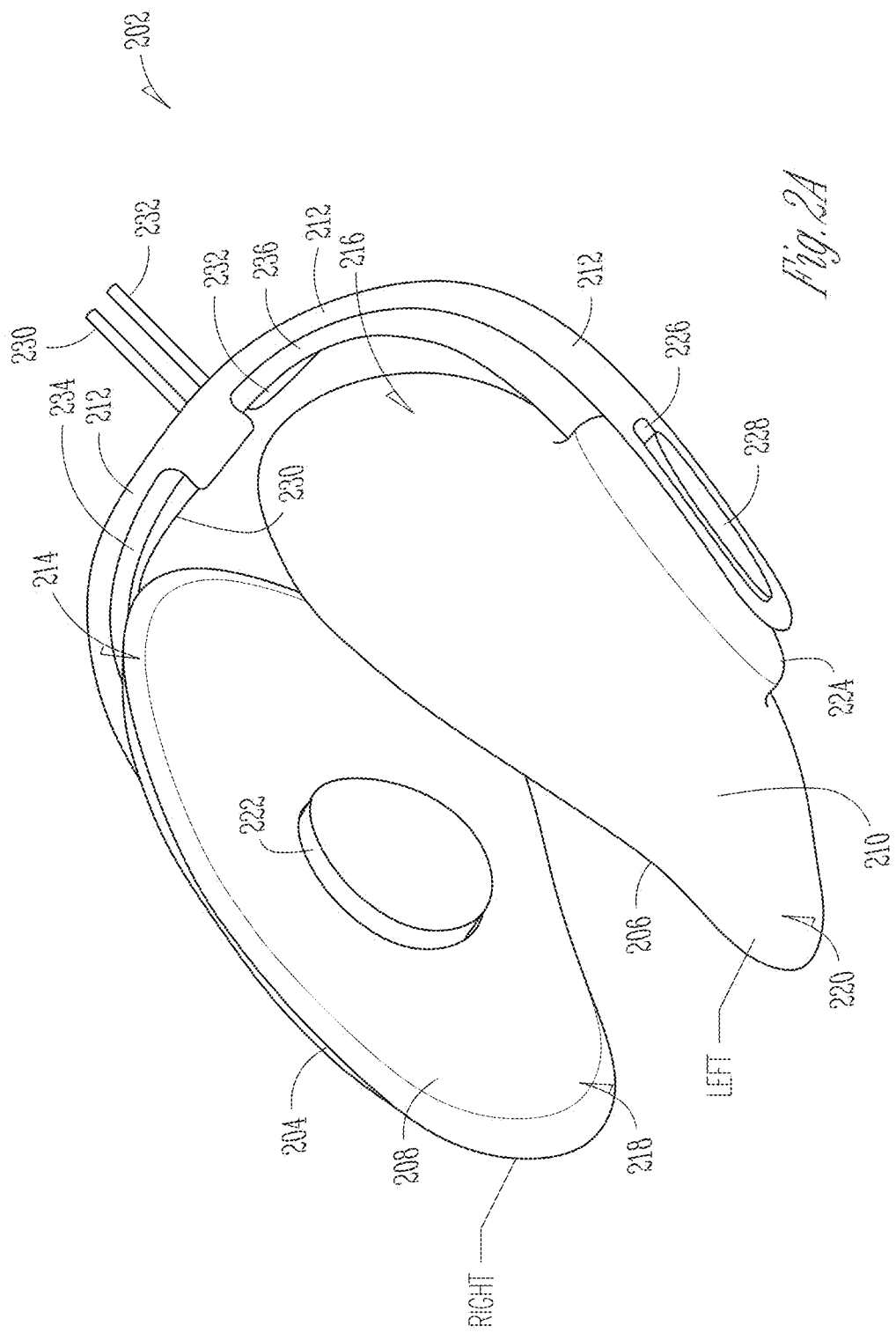

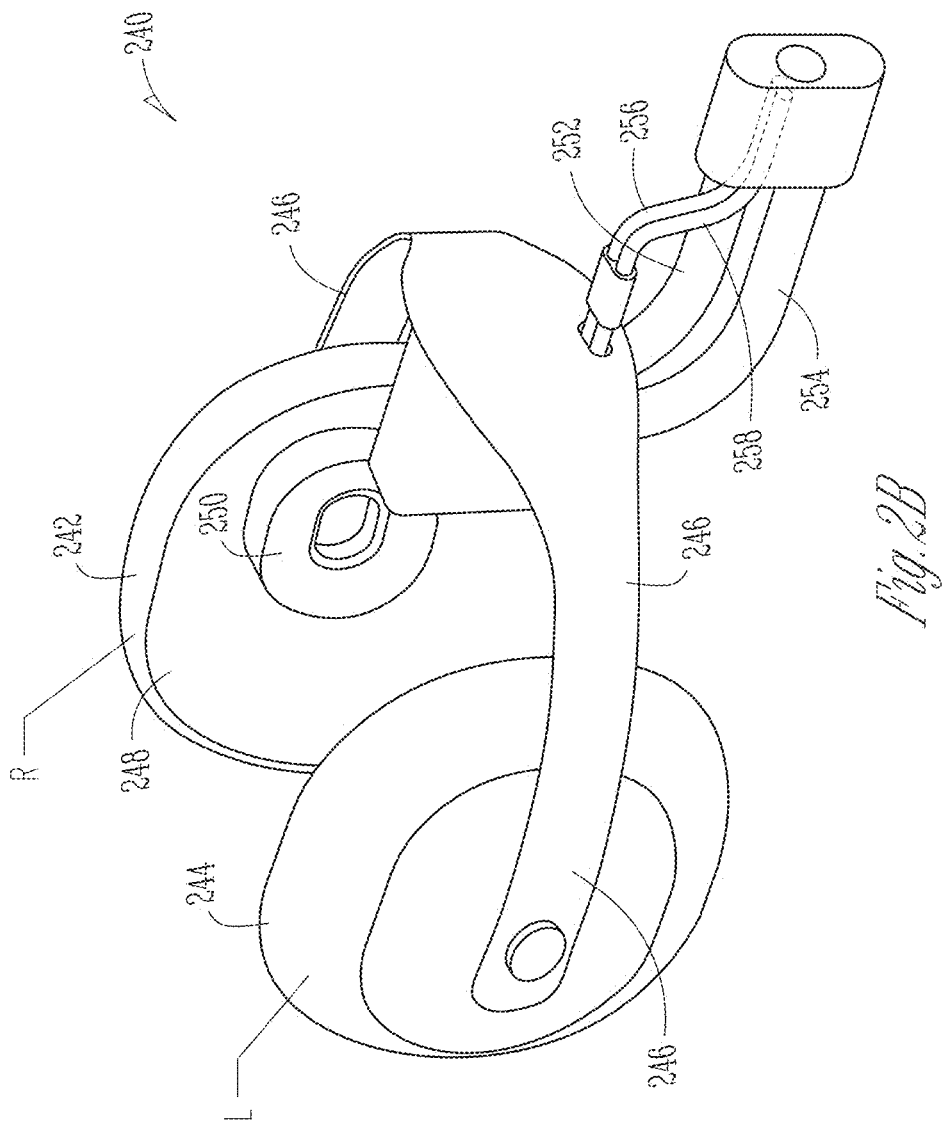

PATIENT-COMPLIANT MRI COIL EMPLOYING PATIENT ANATOMY FOR COIL LOCATION

CLAIM OF PRIORITY

This patent application is a continuation of International Application No. PCT/US2024/048358, filed Sep. 25, 2024, which claims the benefit of priority of Terenzio, U.S. Provisional Patent Application No. 63/602,599 filed Nov. 25, 2023, entitled, "PATIENT-COMPLIANT MRI HEAD COIL EMPLOYING PATIENT ANATOMY FOR COIL LOCATION", all of which are expressly incorporated by reference herein in their entirety.

STATEMENT REGARDING FEDERALLY SPONSORED RESEARCH OR DEVELOPMENT

This invention was made with government support under 5R44EB028728-03 awarded by the National Institutes of Health (NIH). The government has certain rights in the invention.

BACKGROUND

Magnetic Resonance Imaging (MRI) is used to image biological tissue by creating an environment where a nuclear magnetic resonance (NMR) signal is generated. To do this, a sample, e.g., a patient or animal, is first placed in a uniform magnetic field ($B_0$), which is oriented along the Z axis in x/y/z Cartesian space, to create a net magnetic moment parallel to the field of the sample's nuclear magnetic spins. While in the $B_0$ field, a high-power radio frequency (RF) excitation pulse of energy is applied to create Larmor precession of protons in the x-y plane. This is known as the transmit mode of an MRI scan, with the applied RF excitation pulse, commonly referred to as the transmit pulse, as the transmit field, or as the $B_1^+$ field. This transmit pulse is applied at a frequency known as the Larmor frequency, determined by the field strength ($B_0$) of the scanner and the gyromagnetic ratio of the sample's atomic nuclei of interest following the equation below, where y is a known constant for a given element:

$$f_{larmor} = B_0 * (\gamma/2\pi)$$

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1A is an illustrative drawing showing a RF transmit coils and a RF receive coils arranged in receiver array pads in relation to a patient within an MRI system.

FIG. 2A is an illustrative drawing showing a perspective view of first and second side panels of a first example head mountable component of an MRI coil in accordance with some embodiments.

FIG. 2B is an illustrative drawing showing a perspective view of first and second side panels of a second example head mountable component of an MRI coil in accordance with some embodiments.

SUMMARY

Figure 1B:
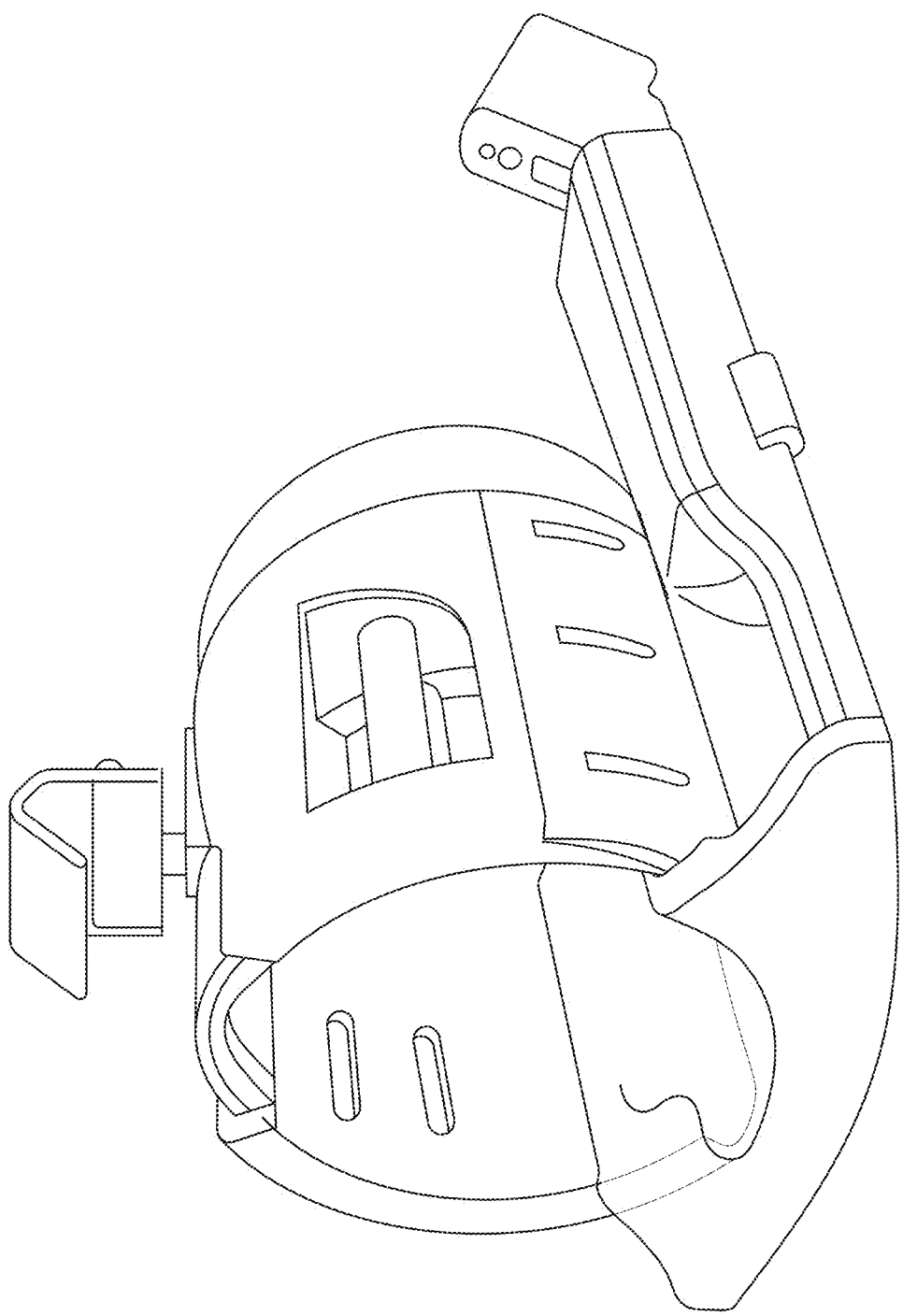
FIG. 1B is an illustrative drawing of a conventional rigid non-wearable head coil.

An MRI receive coil is provided. The MRI receive coil includes a first side panel that includes a first inward facing surface and a first outward facing surface, The first side panel defines a first internal chamber located between the first inward facing surface and the first outward facing surface. The first inward facing surface is contoured to physically contact and overlay substantially an entire first side of a person's face with the first internal chamber located in alignment with the person's first ear. The MRI receive coil includes a second side panel that includes a second inward facing surface and a second outward facing surface. The second side panel defines a second internal chamber located between the second inward facing surface and the second outward facing surface. The second inward facing surface is contoured to physically contact and overlay substantially an entire second face side of the person's head with the second internal chamber located in alignment with the person's second ear. A first audio interface is located within the first internal chamber. A second audio interface is located within the second internal chamber. A first plurality of receive antennas are located within the first side panel to capture signals during MRI system operation. A second plurality of receive antennas are located within the second side panel to capture signals during MRI system operation.

DETAILED DISCLOSURE

Magnetic resonance imaging (MRI) can be used to render high quality images of the brain and cranial structures.

Physicians can use an MRI to see abnormalities such as brain bleeding and swelling, aneurysms, stroke, tumors, as well as upper cervical spine injuries and disorders. FIG. 1A is an illustrative drawing showing radio frequency (RF) transmit coils 110 and a RF receive coils 112 arranged in receiver array pads 113 in relation to a patient within an MRI system 100. A subject patient 102 is shown laying on a platform 104 within an MRI chamber 106. A main magnet 108 is arranged to produce a static $B_0$ magnetic field. During excitation mode, one or more transmit coils 110 transmit an excitation magnetic field pulse that produces a $B_1$ magnetic field perpendicular to the static $B_0$ magnetic field at the frequency of interest. Multiple receive coils 112 are positioned in close proximity to the patient's body. MRI receive coils 112 are used to capture signals generated by the protons in the body when they are temporarily disrupted by radiofrequency pulses in a magnetic field. More particularly, changes in magnetic flux produced by precession of net nuclear magnetization within the subject, following RF-excitation, induces an MR current within the receive coils 112 that can be post-processed to extract frequency, phase, and amplitude information used to construct an MR image.

Anatomy specific coils can be used to image a specified portion of a patient's body. An anatomy specific coil can one or more of include a specific shape or configuration to allow the coils to be closer to the patient's body in one or more locations, provide a desired concentration of coils, or provide a desired position reference. An example of an anatomy specific coil can include a coil configured for imaging one or more regions in the head and/or one or more regions surrounding the head (e.g., a head coil). For example, a coil can be configured to image one or more of the head, brain, sinus, eye orbitals, jaw, or cervical spine. As illustrated in FIG. 1B, a coil for imaging the head and/or surrounding are can include a large rigid structure that fit over a patient's head like a helmet. These coils can be sized for the heads of grown men, which may be larger than the heads of young children, for example. Additionally, these coils can be configured to allow for the use of headphones including one or more of sound deadening or audio connection on the patient, which can further increase the size of the coils. Space between the patient and the coil can affect MRI performance, such as by reducing signal-to-noise ratio (SNR). Additionally, the position of the patient within a coil can be difficult to control. For example, positioning a young child within a helmet-like head coil can be challenging due to the need for precise placement of child's head within the device and because placement typically involves sliding the patient's head into the coil while the patient is lying on a table on his back, which can be especially frightening for a young child.

An example MRI receive coil can include two separate components. In an example, a first MRI coil component can include two side panels attached to a tensioned cross-strap, such as similar to a set of sound deadening and/or audio headphones. The two side panels can be positioned on opposite sides of a patient's head, and can use the ears as anatomical reference points. The side panels can mount MRI RF receiver antennas used for image acquisition antennas. The side panels can also include sound suppression regions that can include cavities that can be filled with a sound absorbing material such as foam. The sound suppression regions can be positioned over a patient's ears to suppress sound during an MRI procedure. An audio interface can be included to pipe one-way communication into a portion of the region in which sound is to be suppressed. The sound absorbing material can block or limit unwanted sound from reaching the patient's ears. Additionally, desired sound may be piped via the audio interface to a patient's ears. The desired sound may be soothing music, for example. Alternatively, the sound may be noise cancelling sound to cancel sound of the MRI system. Alternatively, for example, a piezo-electric device can be mounted within the sound suppression region can be used to produce noise cancelling sound. RF energy of the MRI system can preclude use of radio signals to transmit sound to the sound suppression region. A second MRI coil component can include a neck and head cradle portion that mount MRI RF receiver antennas extending from the cervical spine area at the back of the patient's neck, along and around the back of the head, over the top of the head and extending to the area of the eyebrows. The second MRI coil component need not be rigidly positioned with respect to the patient table, and its position on the table can be customizable to suit the needs of the patient.

FIG. 2A is an illustrative drawing showing a perspective view of a first example head mountable component 202 that houses a plurality of MRI coils (not shown), discussed below with reference to FIGS. 4-5, and that includes first and second side panels 204, 206, in accordance with some embodiments. In an example, the 202 can include or be included in an MRI coil. In the first example head mountable MRI coil component 202, the first panel 204 is a right-side panel for placement along a right side of a person's head (not shown) and the second panel is a left-side panel for placement along a left side of a person's head. The first panel 204 includes a first (right-side) inward facing surface 208 and a first (right-side) outward facing surface (not shown). The second panel 206 includes a second (left-side) inward facing surface (not shown) and a second (left-side) outward facing surface 210. A first (right-side) MRI antenna array (not shown) is located at the first side panel between the first inner surface 208 and first outer surface. A second (left-side) MRI antenna array (not shown) is located at the second side panel 206 between the second inward and the second outer surface 210. A first (right-side) audio interface, which may comprise an audio sound chamber for noise suppression and audio receive (not shown) is located at the first panel 204 between the first inward facing surface 208 and first outward facing surface 207 (shown in FIGS. 10-11). In an example system, the audio interface includes a pneumatic tube that carries sound to a patient from a speaker configured to interoperate with an MRI system. Alternatively, the audio interface can include a piezoelectric device. A second (left-side) audio interface, which may comprise an audio sound chamber for noise suppression and audio receive (not shown) is located at the second side panel 206 between the second inward facing surface and second outward facing surface 210. A tensioned headband 212 can secure the first and second side panels 204, 206 to one another with the first inward facing surface 208 and second inward facing surface facing toward one another. In an example, the first side panel 204 and the second side panel 206 can be mounted to any device capable of holding the panels on either side of patient head, alternatively or in addition to the headband 212. This can include an apparatus that is independent of other components (e.g., the headband), or can include a device mounted to and/or supported by an MRI table or the cradle 300 (e.g., discussed below with respect to FIG. 3). For example, a pair of adjustable posts could be mounted to respective ones of the first and second side panels 204, 206. The adjustable posts can be configured to hold the first and second side panels 204, 206 in a specified position, which can include one or more of a specified height off the MRI table and a specified distance apart.

Example respective first and second side panels 204, 206 are contoured to physically contact and overlay substantially the entire respective right and left side face portions of a person's head, such as while leaving the person's frontal face portion unobstructed. The respective first and second side panels 204, 206 can include respective first and second upper portions 214, 216 which can be contoured to physically contact and overlay respective right and left upper face side portions of a patient's head. The first and second side panels 204, 206 can include respective first and second lower portions 218, 220 which can be contoured to physically contact and overlay respective right and left lower face side portions of a person's head. In an example, respective first and second side panels 204, 206 do not block a person's forward line of sight. In an example, respective first and second side panels 204, 206 do not obstructing the person's nose or mouth.

The first inward facing surface 208 and the second inward facing surface can be formed of a first material that is soft and pliant to human touch or suitable for direct contact with a person's skin and head. In an example embodiment, the first material can include a flexible foam covering, semi rigid polymer or flexible fabric covering, such as closed-cell foam or urethane foam. The first outward facing surface 207 (e.g., shown in FIGS. 10-11) and the second outward facing surface 210 are formed of a second material that can be one or more of light-weight, hard, or durable. In an example embodiment, the second material can be a semi rigid foam, semi flexible polymer or fabric covering polycarbonate plastic. Alternatively, the outward facing surface also can be a soft material, such as foam.

A first inward facing inner ear pad 222 and a second inward facing inner ear pad 225 (shown in FIG. 5) can be provided. The inner ear pad 222 and the inner ear pad 225 can be suitable for physical contact with a person's ears, can face one-another from the opposite-facing first inward facing surface 208 and second inward facing surface 206, or both. In an example embodiment, the first and second pads are sound transmissive. In an example, the first and second pads can be formed (e.g., for comfort) of a soft and/or compliant material, such as can include a semi rigid foam, semi flexible polymer or fabric covering. The first ear pad 222 can protrude outwardly from the first inward facing surface 208 and the second ear pad 225 can protrude outwardly from the second inward facing surface. The first panel 204 can define a first audio interface housing that protrudes outwardly from the first outward facing surface 207 and can define a first chamber in alignment with the first audio interface ear pad 222. The first audio interface housing (not shown) may house a first sound absorbing material within its outward protrusion. The first audio interface housing may house an interface to a first sound source (e.g., piping for piped-in sound or a piezo-electric actuator) between the first outer sound absorbing material and the inner ear pad 222. The second panel 206 can define a second audio interface housing 224 that protrudes outwardly from the second outward facing surface 210 and that can define a second chamber in alignment with the second audio interface ear pad 225. The second audio interface housing 224 may house a second outer sound absorbing material within its outward protrusion. The second audio interface housing 224 may house a second sound source (e.g., piping for piped-in sound or a piezo-electric actuator) between the second outer sound absorbing material and the inner sound absorbing ear pad 222.

Figure 9:
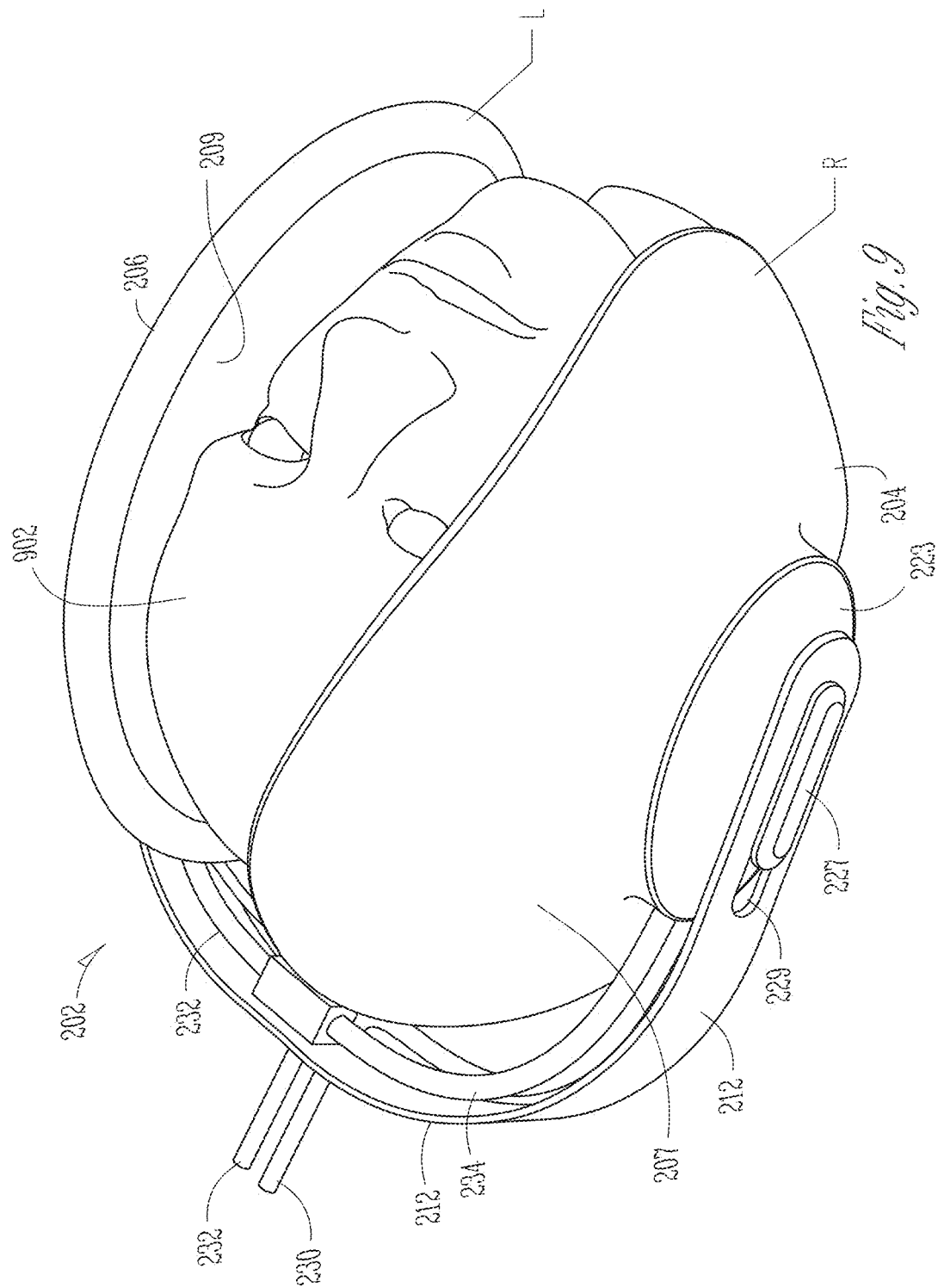
FIG. 9 is an illustrative right front side perspective view of the first example first example head mountable MRI component of FIG. 2A, shown alone mounted to a person's head, separate from the cradle component of the MRI coil.

The headband 212 can form a first slot (not shown) at a first end portion thereof and can form a second slot 226 at a second end portion thereof. In an example, an headband adjustment feature can be used. A first key structure 227 (e.g., as shown in FIG. 9) can upstand from the first outward facing surface 207 at the first audio interface housing. A second key structure 228 can upstand from the second outward facing surface 210 at the second outer audio interface housing. The first key structure can extend through the first slot 229 and the second key structure 228 can extend through the second slot 226 to secure the first and second side panels to the headband. The first key and the second key 228 can be slidable within the respective first slot and the second slot 226, such as to permit adjustment of the positions of the first and second side panels 204, 206 relative to the headband 212. The headband 212 can be formed to be integrally tensioned to impart a clamping force to the first and second side panels 204, 206 to assist in maintaining them in place on opposite sides of a person's head.

A first electrical conductor 230 can couple the first antenna array to an MRI processing system (not shown). A second electrical conductor 232 can couple to the second antenna array to the MRI processing system. A pair of audio signal connectors 234, 236 can couple first and second audio signals to an audio transmission system (not shown).

FIG. 2B is an illustrative drawing showing a perspective view of an example head mountable component 240 that can include first and second side panels 242, 244 in accordance with some examples. The head mountable component 240 can include or be included in an MRI coil. The head mountable component 240 can be configured similarly to the head mountable MRI component 202, or can differ in one or more ways. The first and second side panels 242, 244 can be oval shaped. A headband 246 can secure first and second side panels 242, 244 to one another. A first inward facing surface 248 (e.g., on the first and second side panels 242) and a second inward facing surface ((e.g., on the 244, not shown) can face toward one another. A first inner facing audio interface pad 250 and a second inner facing audio interface pad (not shown) can face one-another from the opposite-facing first inward facing surface 248 and second inward facing surface (not shown). A first electrical conductor 252 can couple a first antenna array (not shown) to an MRI processing system (not shown). A second electrical conductor 254 can couple a second antenna array (not shown) to the MRI processing system. A pair of audio signal connectors 256, 258 can couple first and second audio signals (not shown) to an audio transmission system (not shown). Other details of the second example head mountable MRI component 240 can be similar to those described above for the first example head mountable MRI component 202 and for brevity of disclosure, will not be explained further herein.

Figure 3:
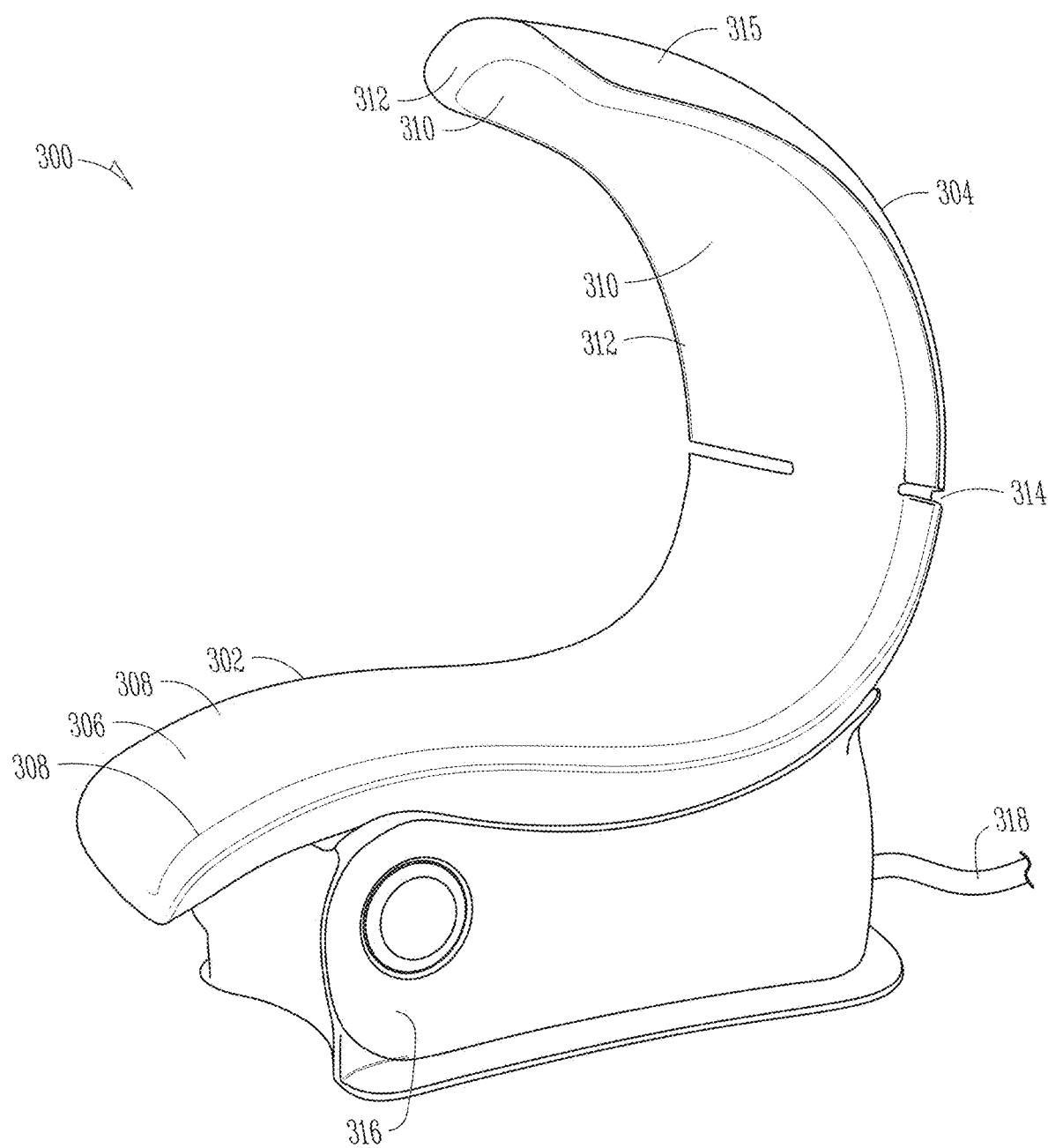
FIG. 3 is an illustrative is an illustrative drawing showing a perspective view of a cradle component of an MRI coil in accordance with some embodiments.

FIG. 3 is an illustrative is an illustrative drawing showing a perspective view of a cradle component 300 in accordance with some embodiments. The cradle MRI component 300 can include or be included in an MRI coil. An example cradle component 300 can define a first cradle portion 302 and a second cradle portion 304. The first cradle portion 302 defines a first inward facing (i.e., facing toward a person's head when in use) recessed channel portion 306. The first recessed channel portion 306 can be bounded by smoothly inclined first sidewalls 308 which can be contoured to be operable to physically contact and cradle a cervical spine portion of a person's anatomy (not shown) or a center-back portion of a person's head (not shown). The second cradle portion 304 can defines a second elongated inward facing recessed channel portion 310. The second elongated recessed channel portion 310 can be bounded by smoothly inclined second sidewalls 312 that are contoured to be operable to overlay and physically contact a center-top portion of a person's head (not shown). The second cradle portion 304 can includes an outward facing top surface 315 that can face in a direction opposite to the channel portion 310.

The cradle component 300 can include a hinge member, which may comprise a flexible section 314, located at a juncture of the first and second cradle portions to permit movement of the second cradle 304 portion relative to the first cradle portion 302. The hinge mechanism 314 can permit repositioning of the second cradle portion 304 between an open position in which the second elongated recessed channel portion 310 faces away from the first recessed channel portion 306 and a closed position in which the second elongated recessed channel portion 310 faces toward the first recessed channel portion 306. In an example embodiment, the first and second cradle portions 302, 304 can be positioned relative to one another to form a semi-circle-like arch contoured to extend about back, top, and frontal portions of a centerline region of a person's head, such that when in the semi-circle-like arch configuration, the second portion of the cradle is positioned opposite the first portion of the cradle. An example hinge member 314 can include a relief, sometimes referred to as a 'living hinge', in the foam, polymer or fabric material or a different material that makes up the rest of the cradle section, which can allow a higher degree of flexibility.

An example embodiment of the first and second cradle portions 302, 304 can be formed from a semi rigid foam, semi flexible polymer or fabric covering. The cradle MRI component 300 also includes a base portion 316 on which the first and second cradle portions 302, 304 are mounted. In an example embodiment, the base portion 316 can be moveably positioned on a table platform (not shown) on which a person can lay during an MRI procedure. An example base 316 includes a rigid material that can be polycarbonate, for example, and the cradle portions 302, 304 mounted thereon to be adjustably positioned on the table platform, both laterally and vertically, depending upon a patient's anatomical dimensions. An example base 316 can include a height or angle adjustable structure for patient positioning such as a collapsible/extensible foot, and/or a collapsible kickstand, and/or a pivot or height adjustable base structure, to raise or lower a person's head or change the angle relative to the table platform. An example base 316 can include a bottom surface contoured to impart increased friction with a table platform surface when patient weight is added. An example base 316 can include positioning "outriggers" that can be fastened to table rails after a patient is suitably positioned to fixedly secure the base in a selected position during an MRI scanning procedure involving the patient. The base portion 316 of the cradle MRI component 300 can include an electrical conductor 318 to transmit MRI RF receive signals to an MRI signal processing system (not shown).

Figure 4:
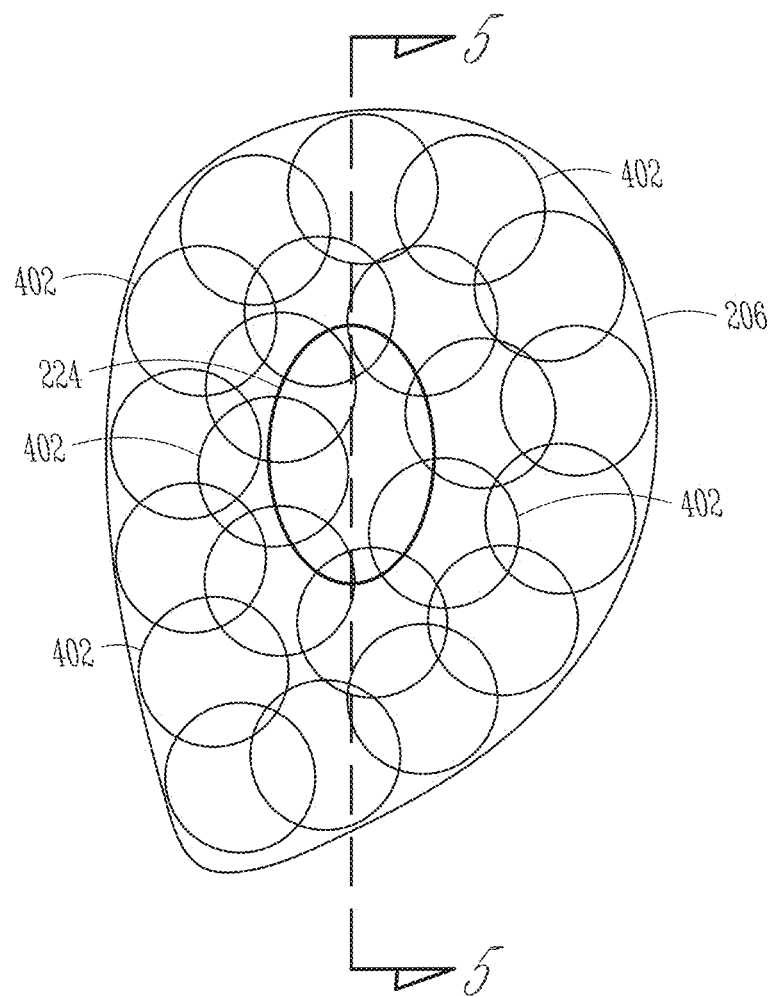
FIG. 4 is an illustrative drawing showing a partially transparent perspective view of the example second side panel of the head mountable MRI component of FIG. 2A.

FIG. 4 is an illustrative drawing showing a partially transparent perspective view of the example second side panel 206 of the head mountable MRI component 202 of FIG. 2A. The second outward facing surface of the second panel 206 is transparent to show a plurality of overlapping receive loop antennas 402 located between the second inward facing surface 209 and the second outward facing surface 210. In an example embodiment, the plurality of receive loop antennas 402 includes antennas to encompass substantially the entire expanses of the second side panel 206 including the second audio interface housing 224 that defines the second chamber that houses second sound suppression material to suppress MRI sounds and that houses the second audio interface. In an example embodiment, a plurality of overlapping receive loop antennas 402 are distributed to uniformly capture signals throughout the second side panel 206, including at the second audio interface housing 224, that are generated by the protons in the body when they are temporarily disrupted by radiofrequency pulses in a magnetic field during MRI system operation. In some embodiments, each loop antenna 402 of the array overlaps with at least one other loop antenna of the plurality of antennas. Similarly, the first side panel 204 of the head mountable component of an MRI component 202 also may include a plurality of overlapping receive loop antennas (not shown) located between the first inward facing surface and the second outward facing surface 210. A similar plurality of receive loop antennas (not shown) that similarly encompass substantially the entire expanses of the first inward facing and outward facing surfaces, including the portions of the first inward facing surface 208 and the first outward facing surface 207 that houses first sound suppression material to suppress MRI sounds and that houses the first sound audio interface. In an example, a material that forms the first or second inward facing surfaces (e.g., semi rigid foam, semi flexible polymer or fabric covering material) may be transparent to MRI RF receive signals. Thus, there need not be sacrifice in receive coil coverage, there need not be sacrifice in SNR required to provide access to sound sources mounted at a patient's ears, or both.

Figure 5:
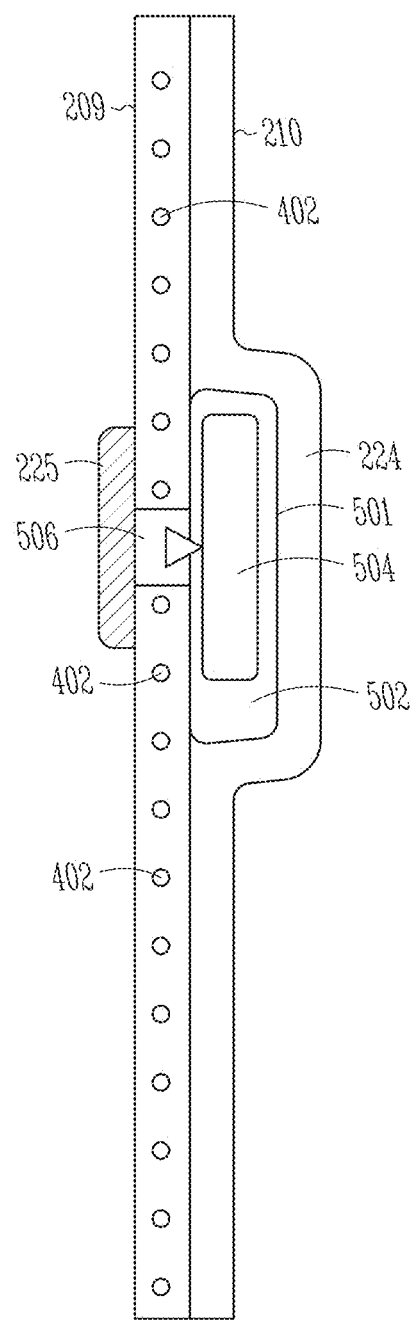
FIG. 5 is an illustrative cross-section view along line 5-5 of FIG. 4.

FIG. 5 is an illustrative cross-section view of the second side panel 206 along line 5-5 of FIG. 4. The cross-sectional view shows the second outward facing surface 210 and the second inward facing surface 209 that generally conforms to a human head shape. Second audio interface housing 224 is shown outwardly protruding from the second outward facing surface 210 and defining the second chamber 501. The second audio interface pad 223 is shown inwardly protruding from the second inward facing surface 209 in alignment with the second audio interface housing 224. The second chamber 501 defined by the second audio interface housing 224 can house the second sound absorbing material 502. The second chamber 501 defined by the second audio interface housing 224 can also house an audio interface 504 to a second sound source. An audio interface 504 may be located within the second chamber 501 between the second audio interface pad 223 and the second sound absorbing material 502. An example second audio interface 504 includes a portion of a sound pipe that opens into the chamber. The audio interface is in communication with sound path conduit 506 (e.g., an air gap or other sound transmissive medium) that extends between the second inwardly facing surface 209 and the second audio interface pad 223. The sound path conduit 506 can communicate sound from the second audio interface 504 to a patient's second ear. An example second audio interface pad 223 is aligned with the second audio interface 504, and more also, with the sound path conduit 506. Cross-sections of receive antennas 402 are shown embedded within the second inward facing surface 209. The audio interface 504 can be used to communicate with a patient and can be used to provide noise cancelling or noise dampening signals during an MRI procedure.

An alternative example second audio interface 504 includes a piezo-electric device that emanates sound such as for noise suppression. The sound path conduit 506 can communicate sound from such a piezo-electric device to a patient's second ear.

In an example embodiment, the sound source (not shown) may be an electronic device located separated from the MRI component 202 such that the MRI system does not interfere with operation of the sound source, and the audio interface may include a sound pipe that communicates with the sound transmission region 506. In an alternative example embodiment, the sound source may be a piezo-electric device that is not impacted by MRI system operation and the audio interface includes the sound transmission region 506.

Persons skilled in the art will understand that the first side panel 204 can be similarly constructed, and therefore, similar details of the first side panel 204 will not be separately described herein.

Figure 6:
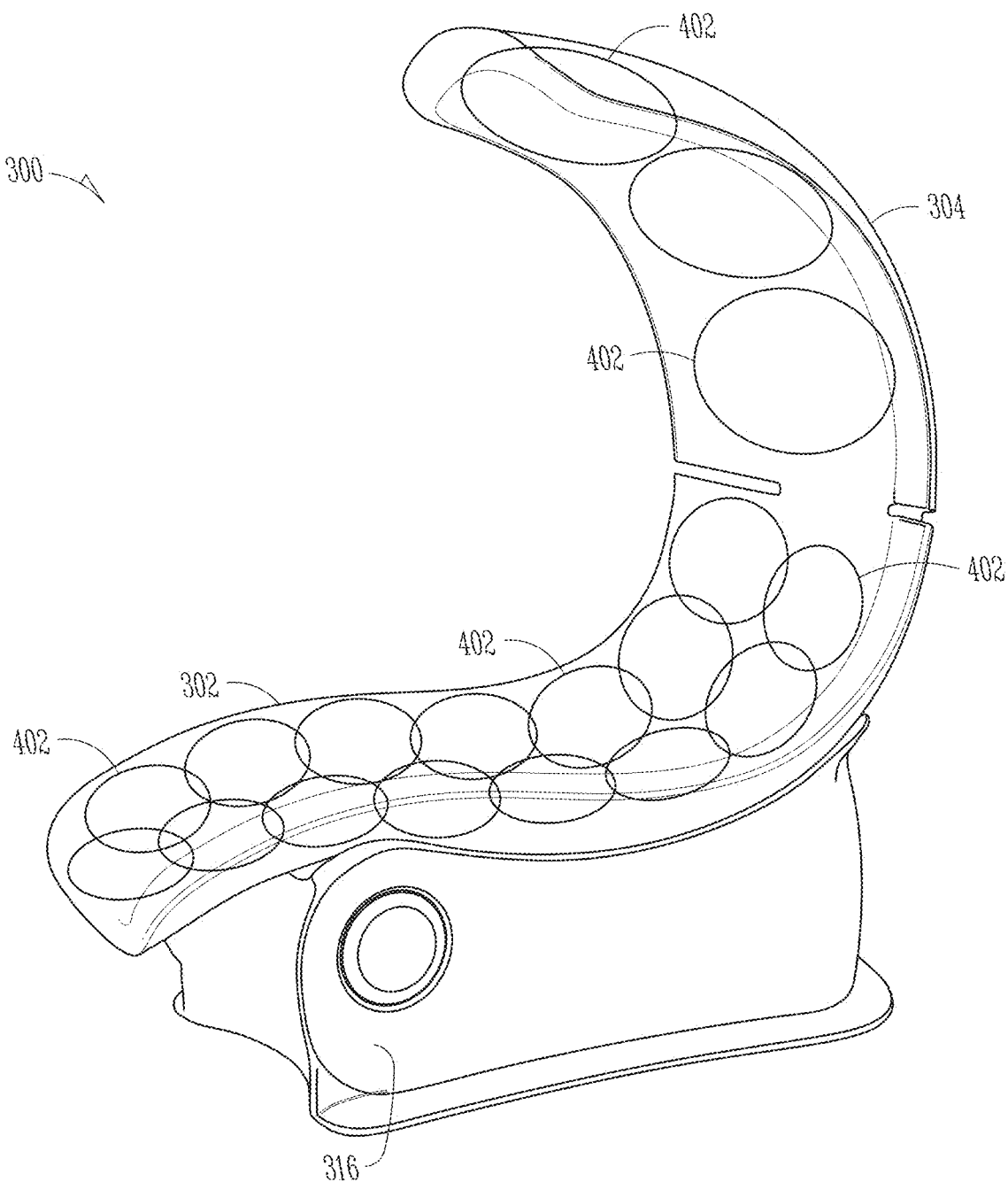
FIG. 6 is illustrative drawing showing a partially transparent perspective view of a cradle MRI component of FIG. 3 in accordance with some embodiments.

FIG. 6 is illustrative drawing showing a partially transparent perspective view of a cradle MRI component 300 of FIG. 3 in accordance with some embodiments. The first and second cradle portions 302, 304 are shown partially transparent to show respective arrays of receive loop antennas, each array of loop antennas including a plurality of loop antennas. In an example, one or more of the antennas can be overlapping antennas. A first array of receive loop antennas 402 is located within the first cradle portion 302. A second array of receive loop antennas 402 is located within the second cradle portion 304. The arrays of receive loop antennas 402 includes loop antennas that can encompass substantially the entire expanses of the first and second cradle portions 302, 304. It will be understood that the material that forms the first and second cradle portions (e.g., semi rigid foam, semi flexible polymer or fabric covering material) can be transparent to MRI RF receive signals.

Figure 7:
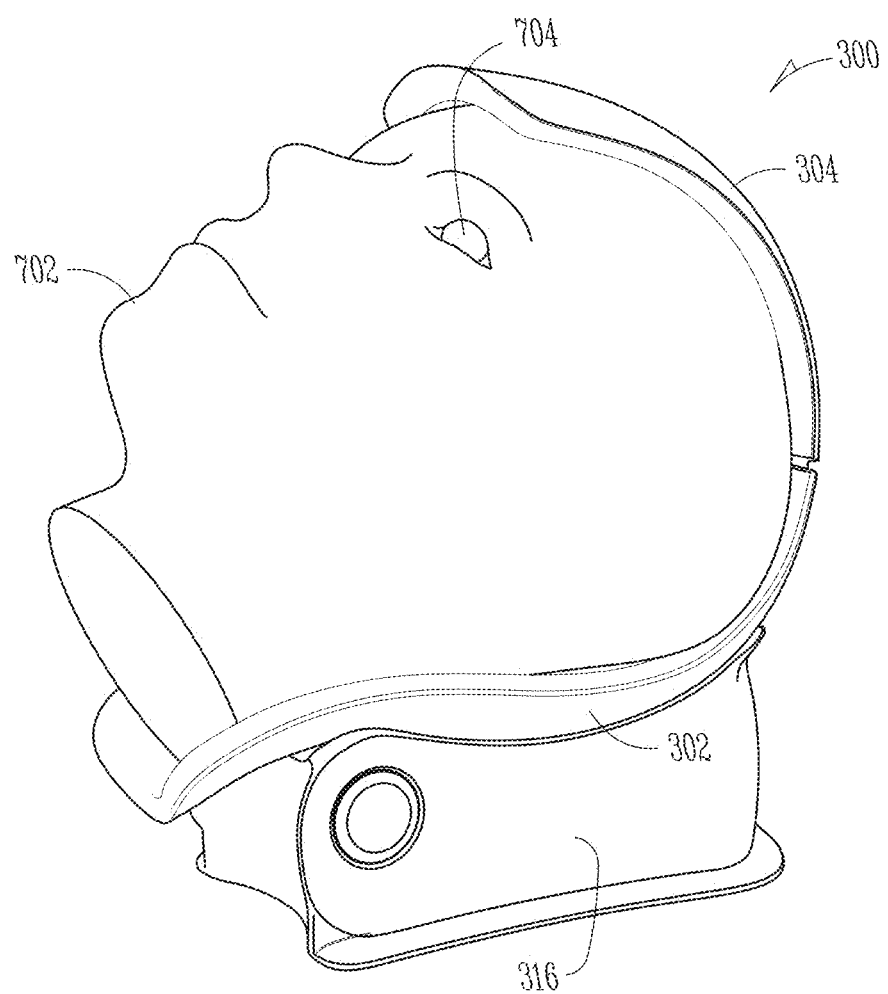
FIG. 7 is an illustrative left front side perspective view of the cradle MRI coil component of FIG. 3 shown mounted to a person's head, separate from the head mountable MRI component.

FIG. 7 is an illustrative left front side perspective view of the example cradle MRI coil component 300 of FIG. 3 shown mounted to a person's head 702, separate from the head mountable MRI component 202 of FIG. 2A. The person lies upon his back with a center portion of his neck and a center portion of the back of the head supported by the first cradle portion 302. The second cradle portion 304 curves about the top of the person's head so as to overlay a center portion of the top of the person's head and arches forward to extend over a center portion of the front of the person's head to just above the person's eyes 704.

Figure 8:
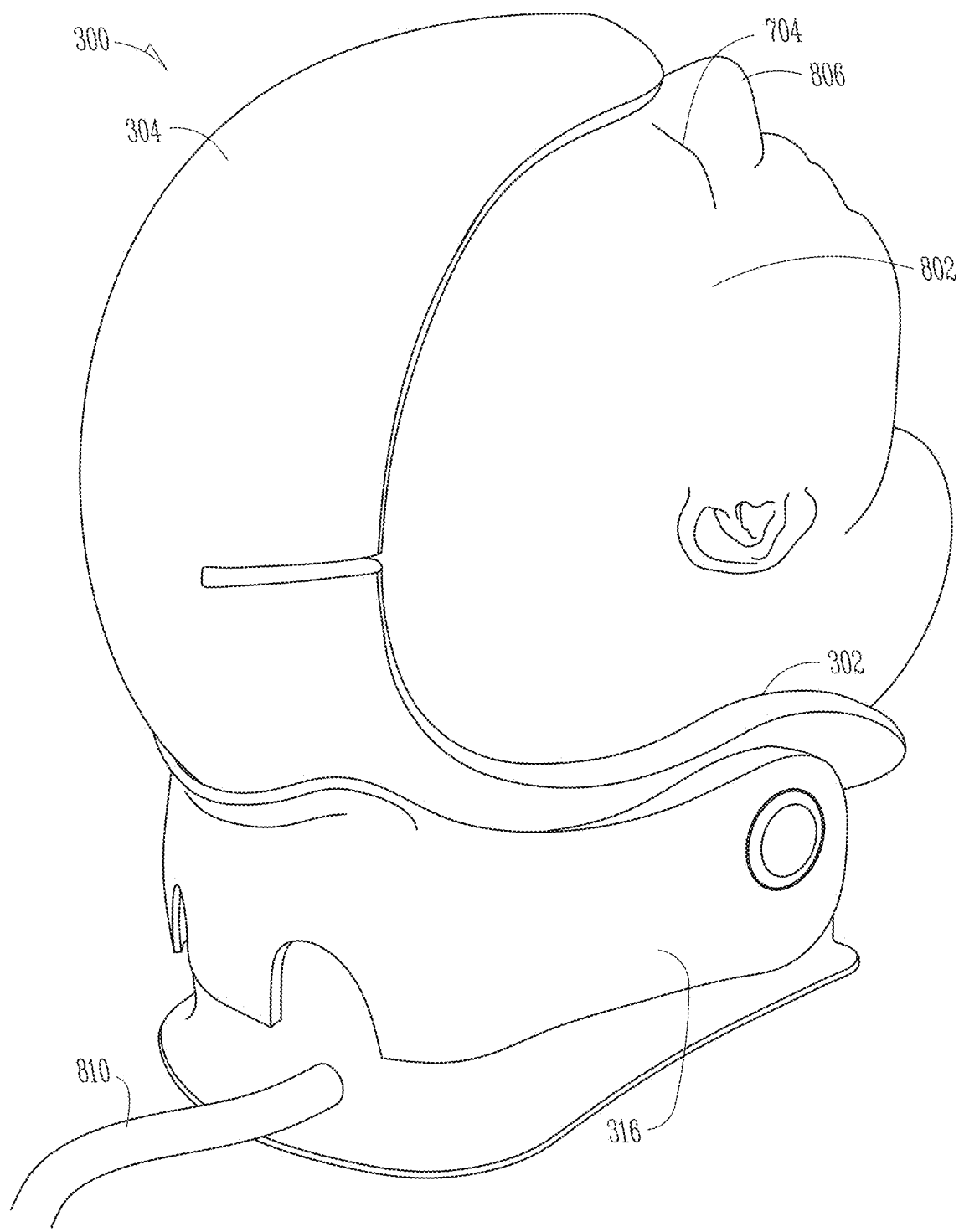
FIG. 8 is an illustrative right rear side perspective view of the cradle MRI coil component of FIG. 3 shown mounted to a person's head, separate from the head mountable MRI component.

FIG. 8 is an illustrative right rear side perspective view of the cradle MRI coil component 300 of FIG. 3, shown mounted to a person's head 802, separate from the head mountable MRI component 202 shown in FIG. 2A. The second cradle portion 304 is shown extending to a region of the person's head above the person's eyes 704 and nose 806. As explained above, the cradle MRI component 300, the base 316 defines a housing in which receiver antenna electronics (not shown) are housed. A conductor cable 810 used to transmit electrical signals between the base and an MRI processing system (not shown) is coupled to the base.

It will be understood from FIGS. 7-8, that not extending below the eyes 704 leaves the face is open area open, reducing risk of claustrophobia. Moreover, it will be understood from FIGS. 7-8 that the cradle MRI coil component 300 solves certain patient positioning problems encountered in the past with rigidly positioned head cradle section that required a patient to conform to a predetermined fixed coil position. Instead, an MRI system operator can move and reconfigure the cradle MRI coil component 300 to suit the needs of a patient. The patient can lay back under the guidance of the operator and the cradle MRI coil base 316 can be custom positioned to the patient as they lay back.

FIG. 9 is an illustrative front perspective view of the first example first example head mountable MRI component 202 of FIG. 2A, shown alone mounted to a person's head 902, separate from the cradle MRI component 300 of FIG. 3. The surface areas of the first and second inward facing surfaces of the first and second side panels 204, 206 can be equal and can be large and wide enough such that both left and right sides of a person's head 902 are located entirely or nearly entirely between them. The first and second side panels 204, 206 can be contoured and arranged to achieve MRI coverage of head, neck and sinus structures that are to be imaged. The head mountable MRI component 202 can realize improved image quality by positioning a large number of the antennas to the left and right sides of a patient's head 902. This positions the antennas at the position of nearest approach to the center of the patient's head, where MRI image quality challenges generally are greatest. Integrating the audio interface (not shown) within the side panels 204, 206 allows the side panels to be positioned closer to the sides of the patient's head while still providing audio signals to the patient. In other words, the presence of the audio sound chamber for noise suppression and audio signal interface does not require spacing the antennas more distantly from the patient's head to accommodate ear pads as had been the case in some earlier MRI systems, the past. Moreover, the "from the sides" approach of the coil leaves the face area open, reduces risk of claustrophobia, allows intubation, if present, and promotes easy egress in emergencies.

Figure 10:
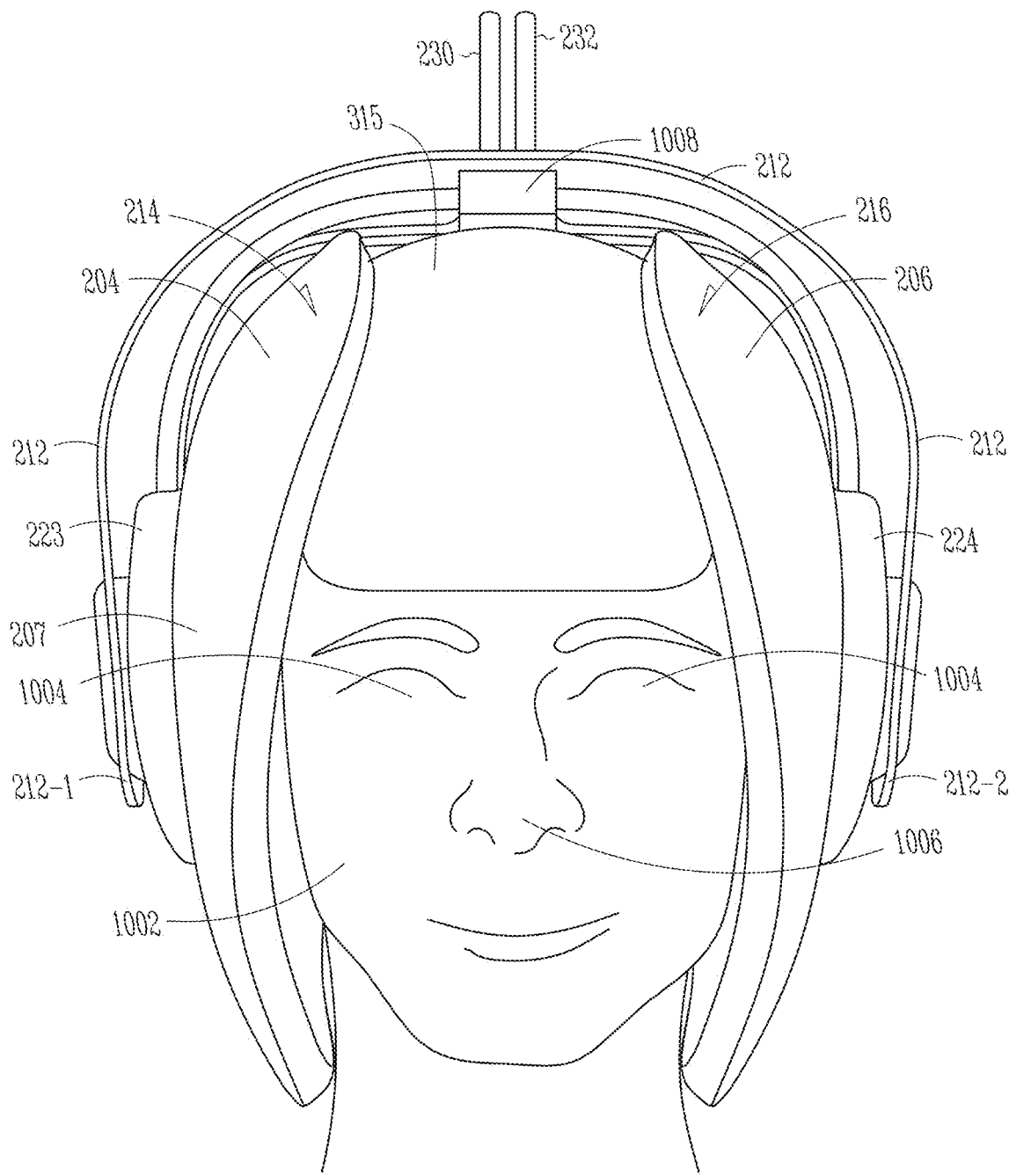
FIG. 10 is an illustrative front view of the entire coil system comprising a head mountable MRI component of FIG. 2A and the cradle MRI component of FIG. 3 mounted to the head of a patient.
Figure 11:
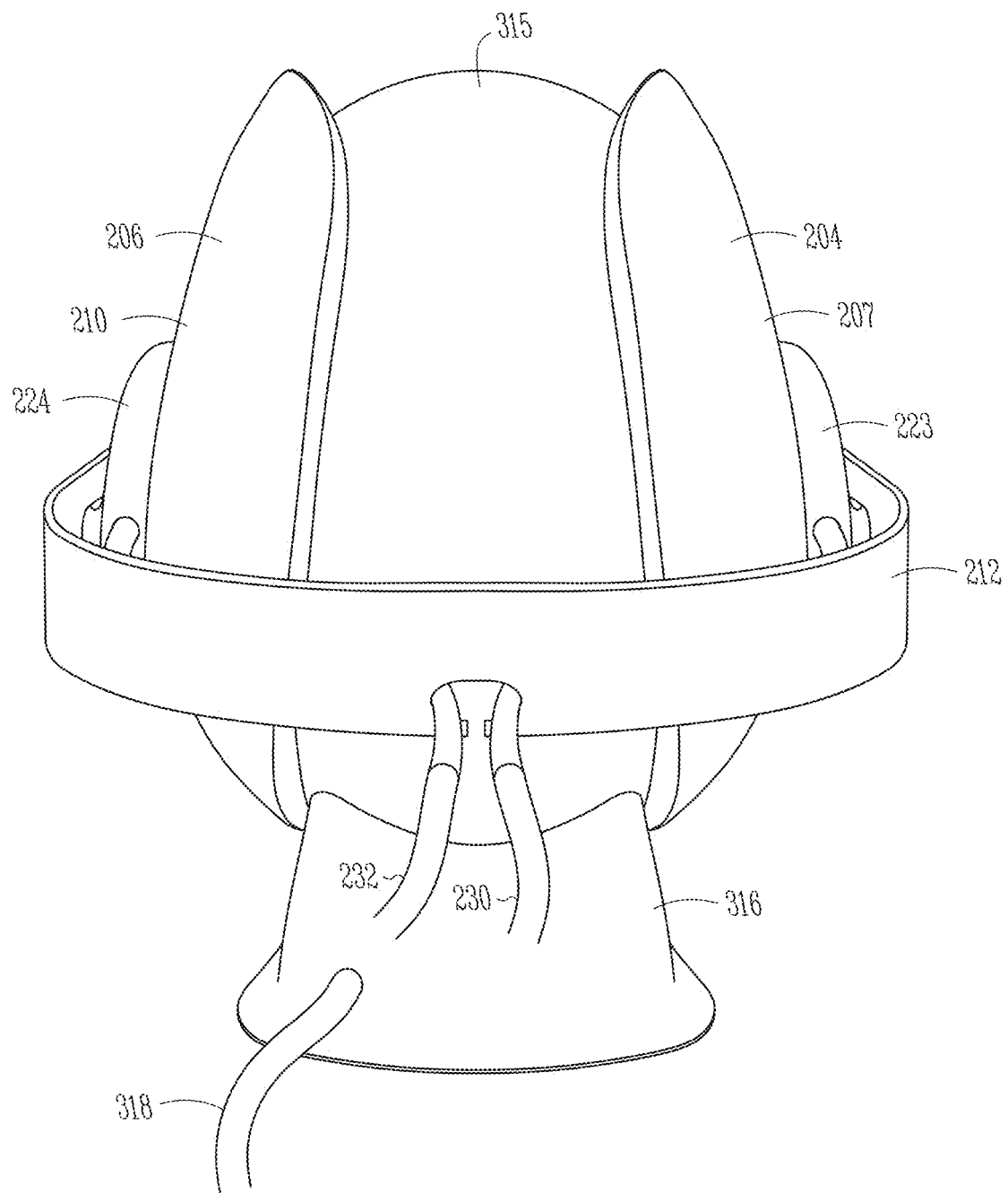
FIG. 11 is an illustrative rear view of the entire coil system comprising the head mountable MRI component of FIG. 2A and the cradle MRI component of FIG. 3 mounted to the head of a patient.

FIG. 10 is an illustrative front view of the entire coil system comprising the head mountable MRI component 202 of FIG. 2A and the cradle MRI component of FIG. 3 mounted to the head of a patient 1002. FIG. 11 is an illustrative rear view of the entire coil system comprising the head mountable MRI component 202 and the cradle MRI component 300 mounted to the head of a patient 1002. The first and second side panels 204, 206 shown extending along the right and left sides of the person's face. The integral first and second audio interface housings 223, 224 are shown located in alignment with the person's right and left ears (not shown). The headband 212 extends over the tops of the first and second side panels 204, 206, is secured at its first and second end portions 212-1, 212-2 to the respective first and second audio interface housings 224 (only one shown). Referring to FIG. 10, the second cradle portion 304 of the MRI cradle component 300 is shown extending over the top of the person's head 1002 to a head location just above the person's eyes 1004 and nose 1006. The upper portions of the first and second side panels 204, 206 are contoured to curve inwardly to overlay and press inwardly upon an outward facing top surface 315 of the second cradle portion 304. Referring to FIG. 11, the first and second conductors 230, 232 extend through an opening in the headband to the base in which they are coupled with antenna electronics (not shown).

Referring again to FIG. 4 and to FIGS. 10-11, it will be appreciated that distribution of loop antenna elements throughout all portions of the first and second side panels 204, 206 including at audio interface locations increases MRI acceleration capability. As used herein "acceleration" refers to the speed with which an MRI image can be captured. Time of acquisition decreases with increasing antenna element count. Systems that sacrifice antenna element count in favor of providing open areas in which no antenna elements are located in order to provide open access to the skull for therapeutic purposes can result in increase in time required for MRI image acquisition. The entire coil system includes several antenna arrays that provide substantially uniform antenna coverage through the first and second side panels, and the first, second, and second cradle portions. Additionally, it is contemplated that in some embodiments, each loop antenna within each of the antenna arrays overlaps with at least one other loop antenna. Thus, the coil system is configured for rapid MRI acquisition.

During installation of the head mounted MRI component 202 and the cradle MRI component 300 of the coil onto a person, the person is first positioned upon the MRI cradle component 300 as shown in FIGS. 7-8. Next, the head mounted MRI component 202 is placed on the person's head in alignment with the persons' ears. The person's ears are used as anatomical reference points or markers and as a specific physical interface between the head mounted MRI component and the person because of the integration between the coil and the audio interfaces. For example, the 202/can include anatomical positioners, which can include the first internal chamber or the second internal chamber. The use of the audio headphones for positioning the head mounted MRI component gives the patient some agency in coil positioning by making positioning of the head mounted MRI component seem as a familiar as positioning a common headphone device.

The headband 212 is secured to the first and second audio interface housings integrally formed at the first and second outward facing surfaces. Referring to FIG. 10, a block 1008 extends downwardly from the headband 212 to contact the outward facing surface 315 of the second cradle portion 340 and to urge the second elongated recessed channel portion 310 toward the top of the person's head. The first and second keys 227, 228 can be secured within the first and second slots 229, 226 at the first and second end regions 212-1, 212-2 of the headband 212 to prevent the headband 212 from sliding upward relative to the first and second side panels while the block provides a downward force. Moreover, a compression force of the headband urges the side panels 204, 206 inwardly toward the person's head. Simultaneously, the body weight of the person's head and neck force the back of the head and the back of the neck to a close proximity with the first cradle portion 302. It is contemplated that all antennas will be within six millimeters of a person's head or neck.

The components of the two-part coil are versatile. The two-part coil can use the headband 212 to adjust to different head sizes and ear positions. Antenna position can be calibrated to the patient's ears using the headphone style ear pad position so that aligning a patient's ears with the headphone style ear pads 222, 225 can be used to align antennas with the patient's head. The head mounted MRI coil component 202 is useable independent of the cradle MRI coil component 300. Conversely, the cradle MRI coil component 300 is useable independent of the head mounted MRI coil component 202.

The following, non-limiting examples, detail certain aspects of the present subject matter to solve the challenges and provide the benefits discussed herein, among others.

EXAMPLES

Example 1 is an MRI receive coil comprising: a first side panel that includes a first inward facing surface and a first outward facing surface and that defines a first anatomical positioner, wherein the first inward facing surface is contoured to physically contact and overlay substantially an entire first face side of a person's head with the first anatomical positioner located in alignment with the person's first ear; a second side panel that includes a second inward facing surface and a second outward facing surface and that defines a second anatomical positioner, wherein the second inward facing surface is contoured to physically contact and overlay substantially an entire second face side of the person's head with the second anatomical positioner located in alignment with the person's second ear; a first plurality of receive antennas located within the first side panel to capture signals during MRI system operation; and a second plurality of receive antennas located within the second side panel to capture signals during MRI system operation.

In Example 2, the subject matter of Example 1 optionally includes wherein: the first anatomical positioner includes a first internal chamber located between the first inward facing surface and the first outward facing surface; and the second anatomical positioner include a second internal chamber located between the second inward facing surface and the second outward facing surface.

In Example 3, the subject matter of Example 2 optionally includes a first audio interface located within the first internal chamber; and a second audio interface located within the second internal chamber.

In Example 4, the subject matter of Example 3 optionally includes wherein the first audio interface includes a first sound pipe; and wherein the second audio interface includes a second sound pipe.

In Example 5, the subject matter of any one or more of Examples 3-4 optionally include first sound suppression material located within the first internal chamber between the first outward facing surface and the first audio interface; and second sound suppression material located within the second internal chamber between the second outward facing surface and the second audio interface.

In Example 6, the subject matter of any one or more of Examples 2-5 optionally include a first ear pad located at the first inward facing surface in alignment with the first internal chamber; a second ear pad located at the second inward facing surface in alignment with the second internal chamber; a first sound path conduit that extends between the first chamber to the first ear pad; and a second sound path conduit that extends between the second chamber to the second ear pad.

In Example 7, the subject matter of any one or more of Examples 2-6 optionally include wherein the first plurality of antennas includes at least one loop antenna that encompasses at least a portion of the first internal chamber; and wherein the second plurality of antennas includes at least one loop antenna that encompasses at least a portion of the second internal chamber.

In Example 8, the subject matter of any one or more of Examples 1-7 optionally include wherein the first plurality of receive antennas are located within the first side panel to uniformly capture signals throughout the first side panel during MRI system operation; and wherein the second plurality of receive antennas are located within the second side panel to uniformly capture signals throughout the second side panel during MRI system operation.

In Example 9, the subject matter of any one or more of Examples 1-8 optionally include a headband that extends between the first side panel and the second side panel; wherein the headband is configured to extend over the top of a person's head while urging the first panel into contact with a first side of the person's head and while urging the second panel into contact with an opposite second side portion of the person's head; wherein the first side panel is contoured to overlay substantially all of the first side of the person's head; and wherein the second side panel is contoured to overlay substantially all of the second side of the person's head.

In Example 10, the subject matter of any one or more of Examples 1-9 optionally include a first cradle portion that defines a recessed region configured to receive therein a back portion of the person's neck and a back portion of the person's head; and a third plurality of receive antennas located at the first cradle portion.

In Example 11, the subject matter of Example 10 optionally includes a second cradle portion that defines an inward facing second recessed region configured to receive therein a top portion of a person's head; and a fourth plurality of receive antennas located at the second cradle portion.

In Example 12, the subject matter of Example 11 optionally includes a hinge member to moveably interconnect the first cradle portion and the second cradle portion.

In Example 13, the subject matter of any one or more of Examples 11-12 optionally include a headband configured to extend over the top of the person's head while urging the first panel into contact with a first side of the person's head and while urging the second panel into contact with an opposite second side portion of the person's head; wherein the first side panel is contoured to overlay substantially all of the first side of the person's head; and wherein the second side panel is contoured to overlay substantially all of the second side of the person's head.

In Example 14, the subject matter of Example 13 optionally includes wherein the headband is configured to extend over the second cradle portion and to urge the second inward facing recessed region toward the top portion of the person's head.

In Example 15, the subject matter of any one or more of Examples 11-14 optionally include wherein the first side panel, second side panel, first cradle portion, and second cradle portion are configured so that when engaged with a person, the person's face area is exposed.

In Example 16, the subject matter of any one or more of Examples 1-15 optionally include wherein the first plurality of antennas includes multiple loop antennas; and wherein the second plurality of antennas includes multiple loop antennas.

In Example 17, the subject matter of any one or more of Examples 9-16 optionally include wherein the first plurality of antennas includes multiple loop antennas; wherein the second plurality of antennas includes multiple loop antennas; and wherein the third plurality of antennas includes multiple loop antennas.

In Example 18, the subject matter of any one or more of Examples 1-17 optionally include wherein: the first anatomical positioner includes a first ear pad located at the first inward facing surface, configured to align the person's first ear relative to the first side panel; the second anatomical positioner includes a second ear pad located at the second inward facing surface, configured to align the person's second ear relative to the second side panel.

In Example 19, the subject matter of any one or more of Examples 1-18 optionally include wherein the MRI receive coil is configured to conform to a specified range of head sizes and shapes.

Example 20 is an MRI receive coil, comprising: a first cradle portion that defines a recessed region configured to receive therein a back portion of a person's neck and a back portion of the person's head; a second cradle portion that defines an inward facing second recessed region configured to receive therein a top portion of a person's head; a hinge member to moveably interconnect the first cradle portion and the second cradle portion; a third plurality of receive antennas located at the first cradle portion; and a fourth plurality of receive antennas located at the second cradle portion.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific examples that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the terms "or" and "and/or" are used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, 4.24, and 5). Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4).

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Such instructions can be read and executed by one or more processors to enable performance of operations comprising a method, for example. The instructions are in any suitable form, such as but not limited to source code, compiled code, interpreted code, executable code, static code, dynamic code, and the like.

Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other examples may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the examples should be determined with reference to the appended claims, along with the full scope of equivalents to which such claims are entitled.

What is claimed is:

1. An MRI apparatus comprising:
a first side panel that includes a first inward facing surface and a first outward facing surface and that defines a first anatomical positioner, wherein the first inward facing surface is contoured to physically contact and overlay substantially an entire lateral left side of a person's head with the first anatomical positioner located in alignment with the person's first ear, wherein the first anatomical positioner is configured to physically interface with the person's first ear to align and limit movement of the first side panel relative to the person's first ear;
a second side panel that includes a second inward facing surface and a second outward facing surface and that defines a second anatomical positioner, wherein the second inward facing surface is contoured to physically contact and overlay substantially an entire lateral right side of the person's head with the second anatomical positioner located in alignment with the person's second ear, wherein the second anatomical positioner is configured to physically interface with the person's second ear to align and limit movement of the second side panel relative to the person's second ear;
a first plurality of receive antennas located within the first side panel to capture signals during MRI system operation; and
a second plurality of receive antennas located within the second side panel to capture signals during MRI system operation.

2. The MRI apparatus of claim 1, wherein:
the first anatomical positioner includes a first internal chamber located between the first inward facing surface and the first outward facing surface; and
the second anatomical positioner include a second internal chamber located between the second inward facing surface and the second outward facing surface.

3. The MRI apparatus of claim 2, comprising:
a first audio interface located within the first internal chamber; and
a second audio interface located within the second internal chamber.

4. The MRI apparatus of claim 3,
wherein the first audio interface includes a first sound pipe; and
wherein the second audio interface includes a second sound pipe.

5. The MRI apparatus of claim 3 further including:
first sound suppression material located within the first internal chamber between the first outward facing surface and the first audio interface; and
second sound suppression material located within the second internal chamber between the second outward facing surface and the second audio interface.

6. The MRI apparatus of claim 2 further including:
a first ear pad located at the first inward facing surface in alignment with the first internal chamber;
a second ear pad located at the second inward facing surface in alignment with the second internal chamber;
a first sound path conduit that extends between the first chamber to the first ear pad; and
a second sound path conduit that extends between the second chamber to the second ear pad.

7. The MRI apparatus of claim 2,
wherein the first plurality of antennas includes at least one loop antenna that encompasses at least a portion of the first internal chamber; and
wherein the second plurality of antennas includes at least one loop antenna that encompasses at least a portion of the second internal chamber.

8. The MRI apparatus of claim 1,
wherein the first plurality of receive antennas are located within the first side panel to uniformly capture signals throughout the first side panel during MRI system operation; and
wherein the second plurality of receive antennas are located within the second side panel to uniformly capture signals throughout the second side panel during MRI system operation.

9. The MRI apparatus of claim 1 further including:
a headband that extends between the first side panel and the second side panel;
wherein the headband is configured to extend over the top of a person's head while urging the first panel into contact with a first side of the person's head and while urging the second panel into contact with an opposite second side portion of the person's head;
wherein the first side panel is contoured to overlay substantially all of the first side of the person's head; and
wherein the second side panel is contoured to overlay substantially all of the second side of the person's head.

10. The MRI apparatus of claim 9,
wherein the first plurality of antennas includes multiple loop antennas;
wherein the second plurality of antennas includes multiple loop antennas; and
wherein the third plurality of antennas includes multiple loop antennas.

11. The MRI apparatus of claim 1 further including:
a first cradle portion that defines a recessed region configured to receive therein a back portion of the person's neck and a back portion of the person's head; and
a third plurality of receive antennas located at the first cradle portion.

12. The MRI apparatus of claim 11 further including:
a second cradle portion that defines an inward facing second recessed region configured to receive therein a top portion of a person's head; and
a fourth plurality of receive antennas located at the second cradle portion.

13. The MRI apparatus of claim 12, further including:
a hinge member to moveably interconnect the first cradle portion and the second cradle portion.

14. The MRI apparatus of claim 12, comprising:
a headband configured to extend over the top of the person's head while urging the first panel into contact with a first side of the person's head and while urging the second panel into contact with an opposite second side portion of the person's head;
wherein the first side panel is contoured to overlay substantially all of the first side of the person's head; and
wherein the second side panel is contoured to overlay substantially all of the second side of the person's head.

15. The MRI apparatus of claim 14,
wherein the headband is configured to extend over the second cradle portion and to urge the second inward facing recessed region toward the top portion of the person's head.

16. The MRI apparatus of claim 12, wherein the first side panel, second side panel, first cradle portion, and second cradle portion are configured so that when engaged with a person, the person's face area is exposed.

17. The MRI apparatus of claim 1,
wherein the first plurality of antennas includes multiple loop antennas; and
wherein the second plurality of antennas includes multiple loop antennas.

18. The MRI apparatus of claim 1, wherein:
the first anatomical positioner includes a first ear pad located at the first inward facing surface, configured to align the person's first ear relative to the first side panel; and
the second anatomical positioner includes a second ear pad located at the second inward facing surface, configured to align the person's second ear relative to the second side panel.

19. The MRI apparatus of claim 1, wherein the MRI receive coil is configured to conform to a specified range of head sizes and shapes.

20. An MRI apparatus, comprising:
a first side panel that includes a first inward facing surface and a first outward facing surface, wherein the first inward facing surface is contoured to physically contact and overlay substantially an entire lateral left side of a person's head;
a second side panel that includes a second inward facing surface and a second outward facing surface, wherein the second inward facing surface is contoured to physically contact and overlay substantially an entire lateral right side of the person's head;
a first plurality of receive antennas located within the first side panel to capture signals during MRI system operation; and
a second plurality of receive antennas located within the second side panel to capture signals during MRI system operation;
a headband that extends between the first side panel and the second side panel;
wherein the headband is configured to extend over the top of a person's head while urging the first panel into contact with a first side of the person's head and while urging the second panel into contact with an opposite second side portion of the person's head;
a first cradle portion that defines a recessed region configured to receive therein a back portion of a person's neck and a back portion of the person's head;
a second cradle portion that defines an inward facing second recessed region configured to receive therein a top portion of a person's head;
a hinge member to moveably interconnect the first cradle portion and the second cradle portion, wherein the first side panel, second side panel, and headband are not mechanically connected to the first cradle portion or the second cradle portion;
a third plurality of receive antennas located at the first cradle portion; and
a fourth plurality of receive antennas located at the second cradle portion.

* * * * *